(12) United States Patent
Stachler et al.

(10) Patent No.: US 12,534,118 B2
(45) Date of Patent: Jan. 27, 2026

(54) TREATMENT CART WITH PASS THROUGH TRAY

(71) Applicant: Midmark Corporation, Versailles, OH (US)

(72) Inventors: Brian L. Stachler, New Bremen, OH (US); Darin G. Whittington, Versailles, OH (US)

(73) Assignee: Midmark Corporation, Versailles, OH (US)

( * ) Notice: Subject to any disclaimer, the term of this patent is extended or adjusted under 35 U.S.C. 154(b) by 425 days.

(21) Appl. No.: 18/110,995

(22) Filed: Feb. 17, 2023

(65) Prior Publication Data

US 2023/0264730 A1     Aug. 24, 2023

Related U.S. Application Data

(60) Provisional application No. 63/311,748, filed on Feb. 18, 2022.

(51) Int. Cl.
*B62B 3/00*     (2006.01)

(52) U.S. Cl.
CPC .................................. *B62B 3/005* (2013.01)

(58) Field of Classification Search
CPC ...................................................... B62B 3/005
See application file for complete search history.

(56) References Cited

U.S. PATENT DOCUMENTS 9,242,664 B2 *   1/2016   Arceta ................. A61G 12/001

* cited by examiner

*Primary Examiner* — Bryan A Evans
(74) *Attorney, Agent, or Firm* — Frost Brown Todd LLP

(57) ABSTRACT

A cart for tending to a patient includes a base, a tabletop, a body, a drawer, and a tray. The base has a plurality of wheels. The body vertically extends from the base to the tabletop and supports the tabletop thereon. The drawer is supported by the body and configured to selectively move from a first closed position toward a first open position. The tray is movably supported by the body such that the tray is configured to selectively move from a stowed position toward a first lateral position and from the stowed position toward a second lateral position. The tray in the stowed position is vertically below the tabletop. The tray in the first and second lateral positions projects from the body such that at least a portion of the tray is not vertically below the tabletop and thus exposed for access.

20 Claims, 9 Drawing Sheets

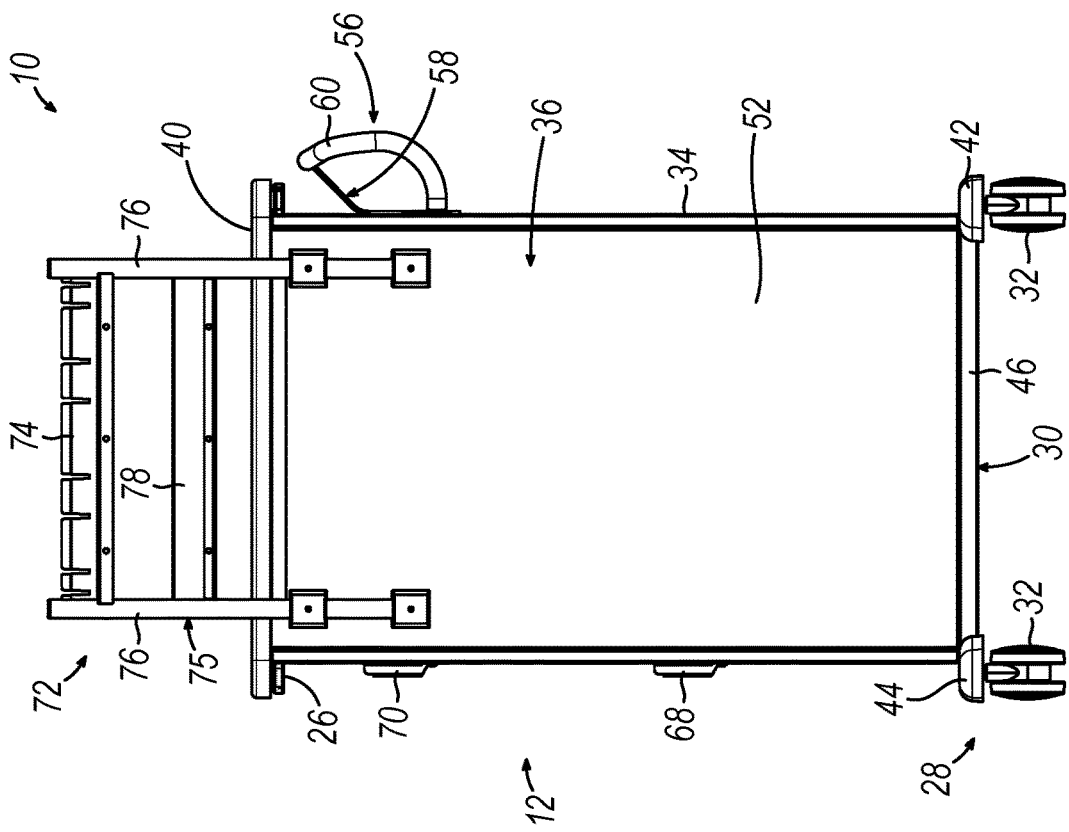
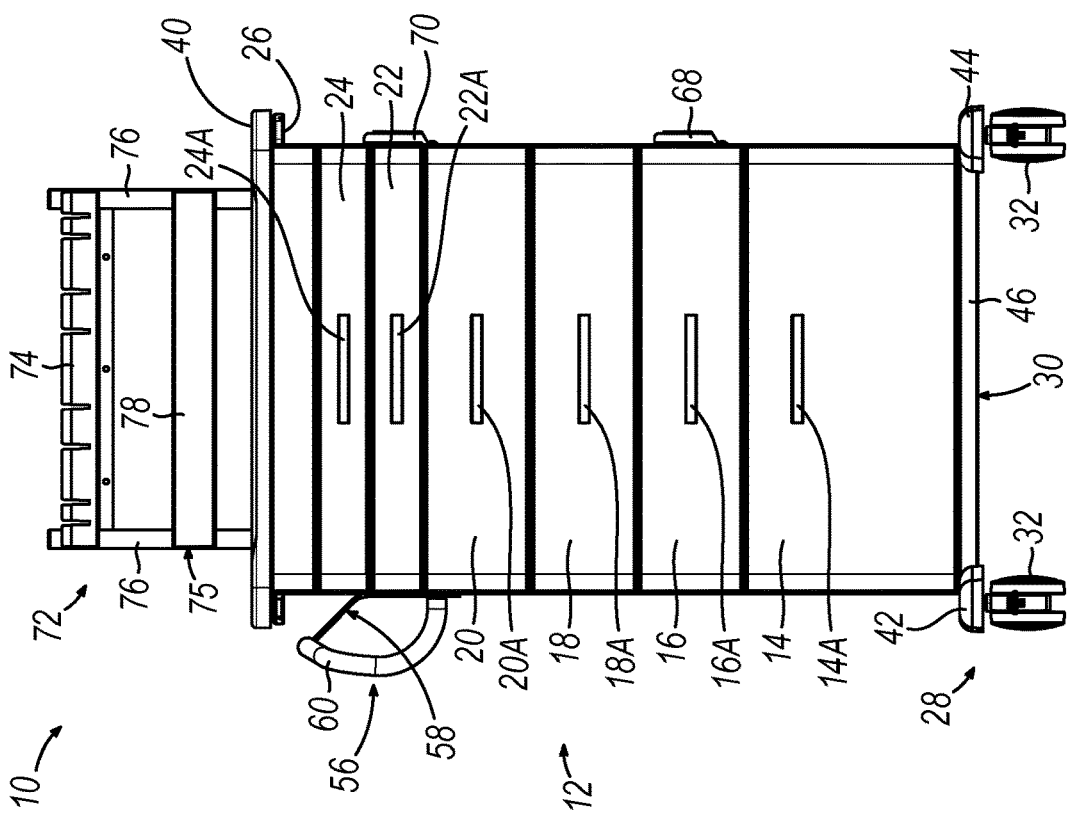

US 12,534,118 B2

TREATMENT CART WITH PASS THROUGH TRAY

CROSS-REFERENCE TO RELATED APPLICATION

This application claims priority to U.S. Pat. App. No. 63/311,748, entitled "Treatment Cart with Pass Through Tray," filed Feb. 18, 2022, the disclosure of which is incorporated by reference herein in its entirety.

BACKGROUND

Conventional carts for storing and transporting medical supplies are generally well known and used to aid in the treatment of patients. Such conventional carts may provide interior and/or exterior storage capacity for medical supplies as desired by a user, such as a doctor, nurse, technician, or other medical care provider.

While conventional carts may store and transport medical supplies, many conventional carts become overwhelmed by the weight, number, and variety of medical supplies desired in a given healthcare facility. For example, the distribution of such supplies may shift during use such that movement of the cart from patient to patient may increase the risk of tipping over during use, potentially harming the user or patient. Movable locations for storage of these medical supplies during use may exacerbate this risk of tipping and harm.

Furthermore, many medical supplies require manipulation and preparation during treatment such that available surface area on which to place these medical supplies may be desirable. This surface area may be crowded, blocked, or otherwise inaccessible due to these medical supplies being placed as otherwise desired by the user. Such inaccessibility may increase after placing medical supplies to address one patient's needs followed by differing needs of patients thereafter.

There is need for a cart and related methods for tending to a patient in a healthcare facility, particularly for storing and transporting medical supplies, that addresses present challenges and characteristics such as those discussed above.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

FIG. 3 depicts a front elevational view of the treatment cart of FIG. 1;

FIG. 4 depicts a rear elevational view of the treatment cart of FIG. 1;

Figure 1:
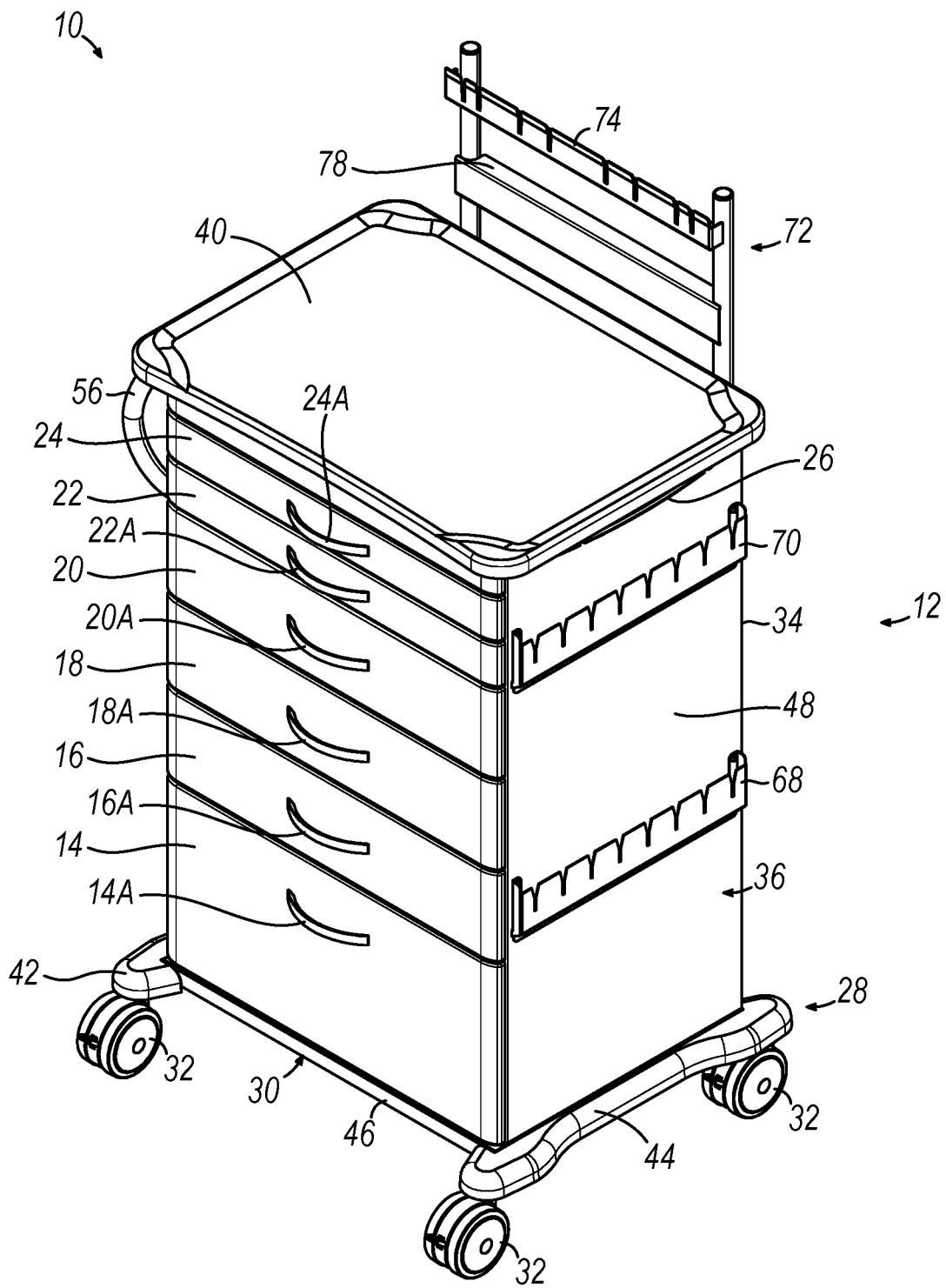
FIG. 1 depicts a front perspective view of an exemplary treatment cart including a plurality of drawers and a tray configured to move through a plurality of positions.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Treatment Cart

Figure 2:
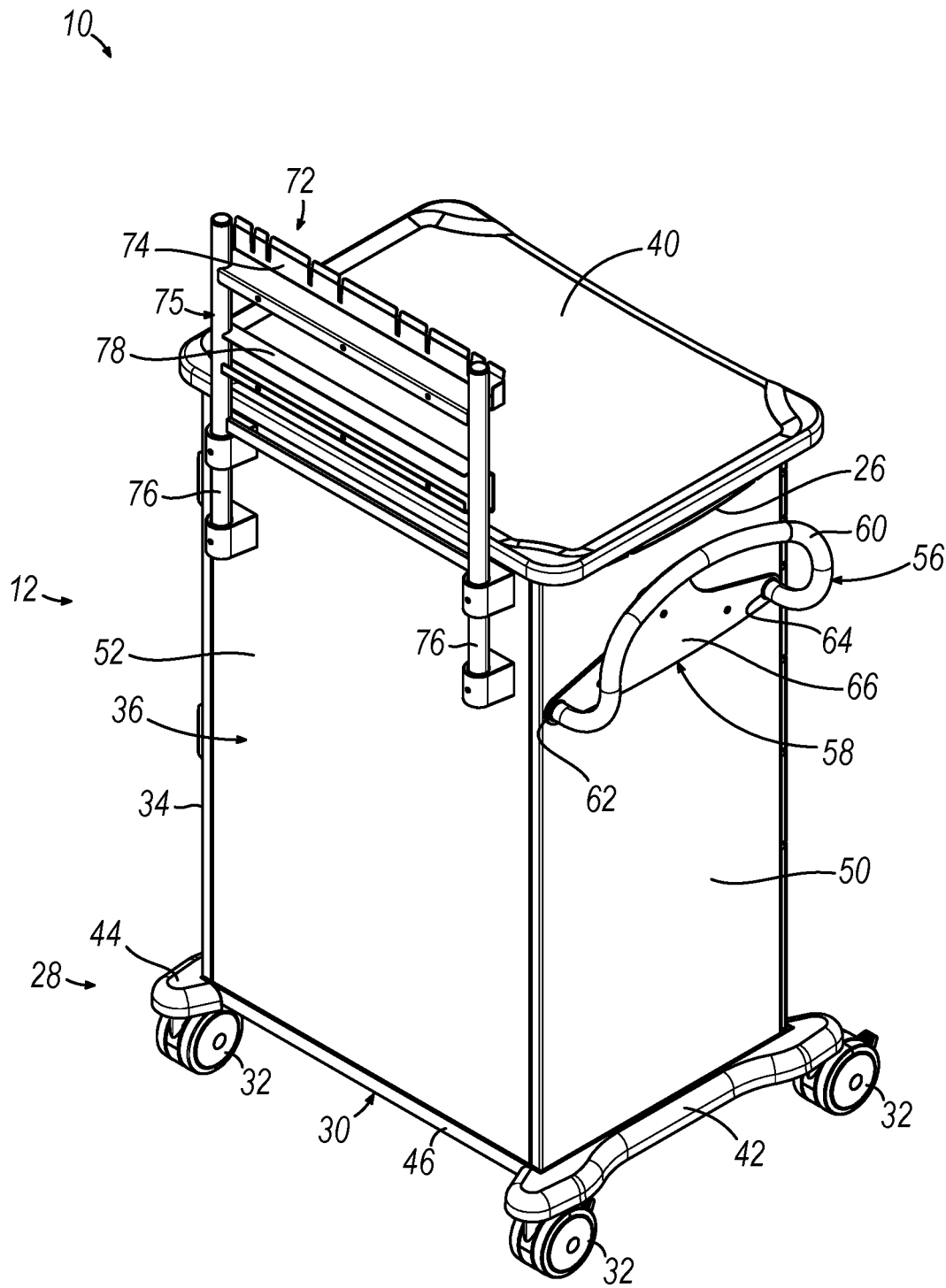
FIG. 2 depicts a rear perspective view of the treatment cart of FIG. 1.
Figure 6:
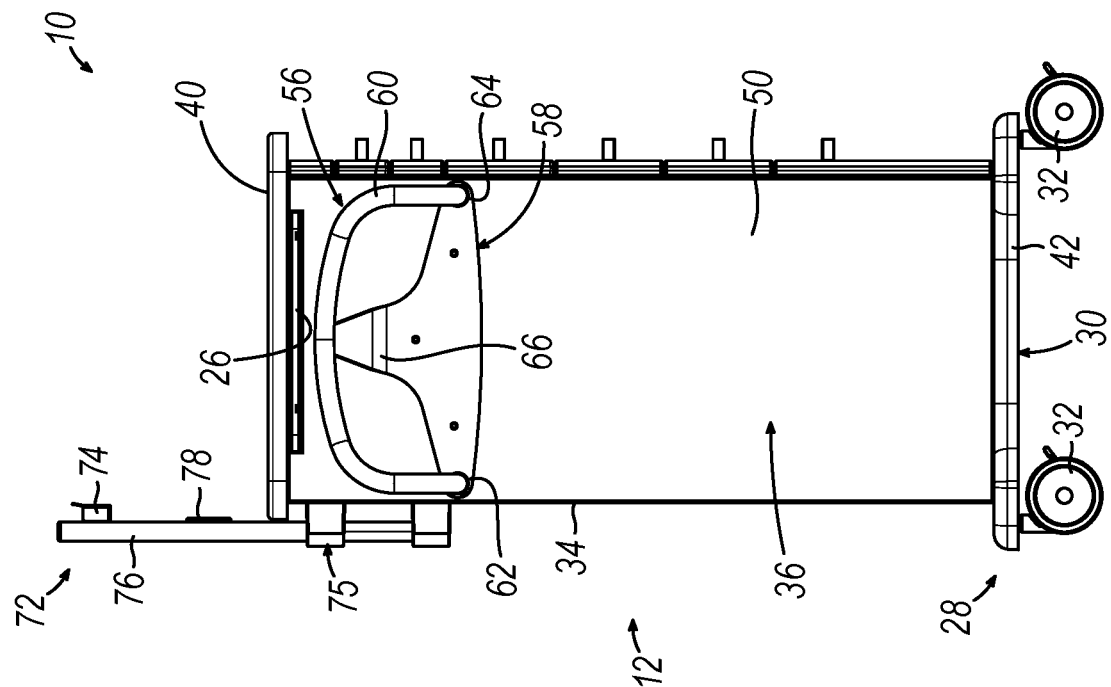
FIG. 6 depicts a left-side elevational view of the treatment cart of FIG. 1.
Figure 5:
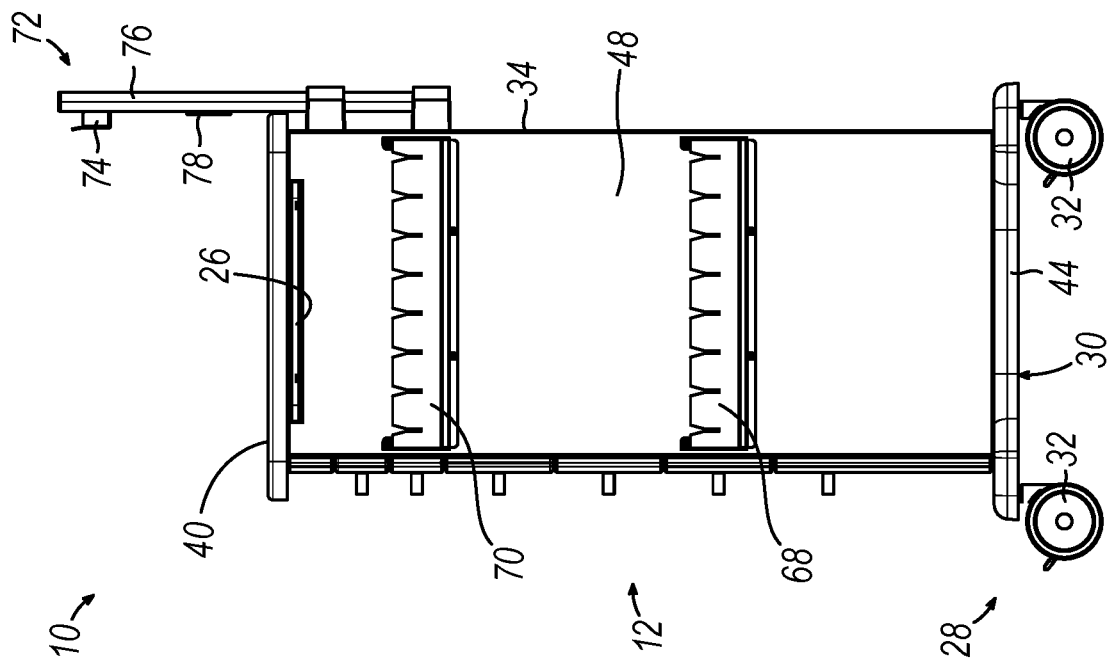
FIG. 5 depicts a right-side elevational view of the treatment cart of FIG. 1.

FIGS. 1-2 show an exemplary treatment cart (10) including a body (12), a plurality of drawers (14, 16, 18, 20, 22, 24) supported by body (12) and configured to selectively move relative to body (12) between closed and open positions, and a tray (26) also supported by body (12) and configured to selectively move from a stowed position to a right lateral position or a left lateral position as discussed below in greater detail. Treatment cart (10) of the present example also includes a base (28) having a support structure (30) undergirding body (12) and connected atop a plurality of wheels (32) such that base (28) supports body (12) above a floor while allowing base (28) and all features attached relative to base (28) to be selectively moved along floor during use. Body (12) has a frame (34) as well as a housing (36) connected to frame (34) to at least partially enclose an interior storage space (38) (see FIG. 8) within housing (36). Each of frame (34) and housing (36) shown in FIGS. 1-2 extend vertically upward from support structure (30) to a tabletop (40) such that drawers (14, 16, 18, 20, 22, 24) are arranged in column arrangement with tray (26) positioned vertically between tabletop (40) and top drawer (24). Tray (26) is movably supported by frame (34) between the stowed, left lateral, and right lateral positions. More particularly, tray (26) in the stowed position is vertically below tabletop (40) and generally hidden from use. In contrast, tray (26) in the left and right lateral positions respectively projects leftward and rightward from frame (34) such that at least leftward and rightward portions of tray (26) are not vertically below tabletop (40) and thus exposed for access and use as discussed below in greater detail.

While the present example of treatment cart (10) has four wheels (32) connected in each respective corner of support structure (30), alternative examples may use more or less wheels, or any other structure configured to movably support body (12) above the floor. The invention is thus not intended to be unnecessarily limited to the wheeled arrangement shown and described herein. Furthermore, drawers (14, 16, 18, 20, 22, 24), tray (26), and tabletop (40) are shown in the present example as arranged in the column arrangement discussed above. However, drawers (14, 16, 18, 20, 22, 24), tray (26), and tabletop (40) may be supported by body (12) in any arrangement relative to each other such that the invention is not intended to be unnecessarily limited to the column arrangement of the present example.

With respect to FIGS. 1-4, a lower portion of treatment cart (10) includes support structure (30) and wheels (32) discussed briefly above. More particularly, support structure (30) of the present example includes left and right lateral outrigger portions (42, 44) respectively extending leftward and rightward laterally from a central portion (46) of support structure beyond frame (34) and housing (36) of body (12). Wheels (32) are respectively mounted at four opposing corners of left and right lateral outrigger portions (42, 44) such that wheels (32) are similarly positioned laterally outward from frame (34) and housing (36) to define a laterally extending footprint for supporting frame (34) and housing (36) laterally within such footprint for greater stability than positioning wheels (32) directly below frame (34) and/or housing (36).

Frame (34) extends vertically upward from central portion (46) of support structure (30) to tabletop (40). In addition, housing (36) includes a right panel (48), a left panel (50), and a rear panel (52), each of which is secured to and supported by frame (34) while also similarly extending vertically upward from central portion (46) of support structure (30) to tabletop (40). In this respect, left, right, and rear panels (48, 50, 52) defining a generally U-shaped lateral cross-section with a front opening (54) (see FIG. 8) opposite rear panel (52) configured to receive drawers (14, 16, 18, 20, 22, 24) into interior storage space (38) (see FIG. 8) as discussed below in greater detail.

Treatment cart (10) of the present example shown in FIGS. 3-6 also includes additional features for enhancing grip and manipulation of treatment cart (10) during use as well as additional storage capacity. By way of example, an upper portion of treatment cart (10) includes a handle (56) attached to left panel (50). Handle (56) is also anchored to frame (34) in one example to further strengthen and rigidify handle (56) for improved performance while being gripped and offering greater control of treatment cart (10) while being moved along the floor. Handle (56) includes a handle plate (58) directly secured to left panel (50) and a handlebar (60) extending from handle plate (58). Handlebar (60) shown in the present example has opposing terminal ends (62, 64) directly connected to handle plate (58) at left panel (50), whereas central portion (66) of handle plate (58) extends outward from left panel (50) to connect to a portion of handlebar (60) offset from left panel (50). This portion of handlebar (60) centrally positioned between terminal ends (62, 64) is thus spaced from left panel (50) in order to provide a user with ample clearance between left panel (50) and handlebar (60) to grip during use. While the present example of handlebar (60) generally curves upward from terminal ends (62, 64) to a crest thereof and is rigidly connected to handle plate (58) at three distinct locations, it will be appreciated that alternative handle shapes and connections may be similarly used such that the invention is not intended to be unnecessarily limited to the particular handle (56) shown in the present example.

Additional storage capacity on treatment cart (10) beyond interior storage space (38) is further provided by a lower bin rack (68) and an upper bin rack (70) on right panel (48) as well as a rear rack assembly (72) above tabletop (40). Lower and upper bin racks (68, 70) of the present example are shown fixed to right panel (48). However, in one example, one or both of lower and upper bin racks (68, 70) may be releasably connected to right panel (48) or any another portion of body (12) so as to be easily repositioned as desired by the user. Each of lower and upper bin racks (68, 70) are configured to releasably and selectively receive bins (not shown) for retaining various articles, such as medical supplies, during use.

Rear rack assembly (72) includes a rear bin rack (74) similar to lower and upper bin racks (68, 70) discussed above, but supported above tabletop (40) by a rear bracket assembly (75) extending vertically upward from rear panel (52). More particularly, rear bracket assembly (75) includes a pair of opposing vertical supports (76) secured to rear panel (52). Rear bin rack (74) extends between vertical supports (76) and connects to each of vertical supports (76). However, in one example, rear bin rack (74) may be releasably connected to vertical supports (76) or any another portion of body (12) so as to be easily repositioned as desired by the user. As shown in the present example, rear bracket assembly (75) further includes a lateral cross-member (78) connected to and extending between each of vertical supports (76) to provide additional structural rigidity to rear rack assembly (72).

Figure 8:
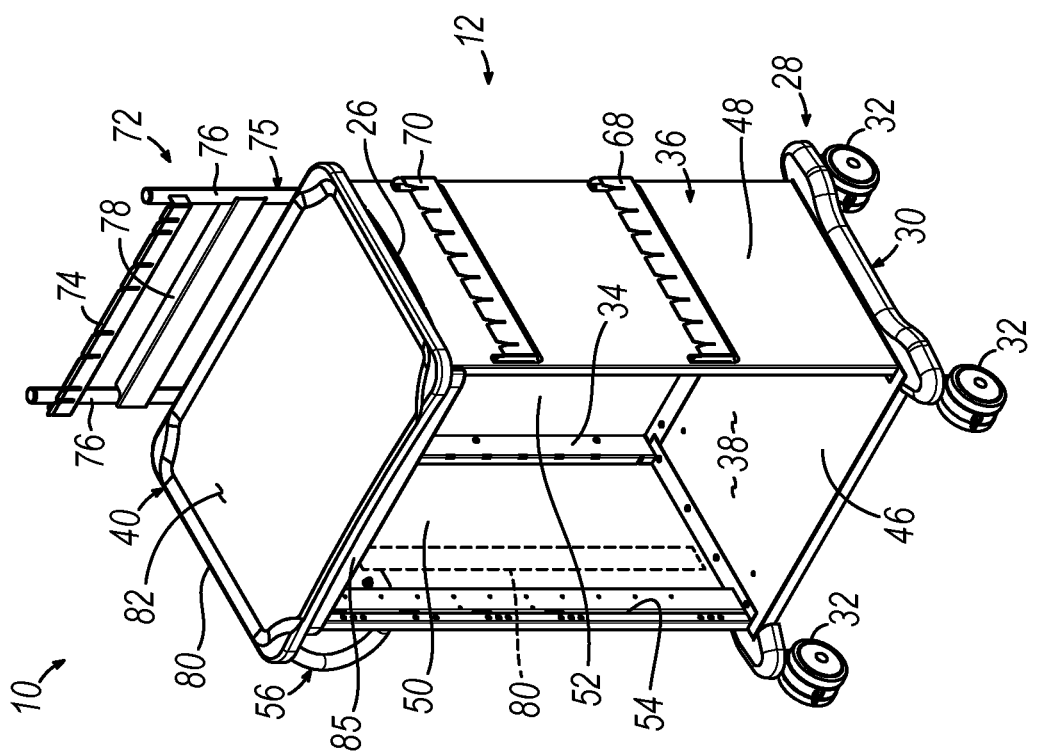
FIG. 8 depicts a front perspective view of the treatment cart of FIG. 1 with the plurality of drawers hidden for additional clarity.
Figure 7:
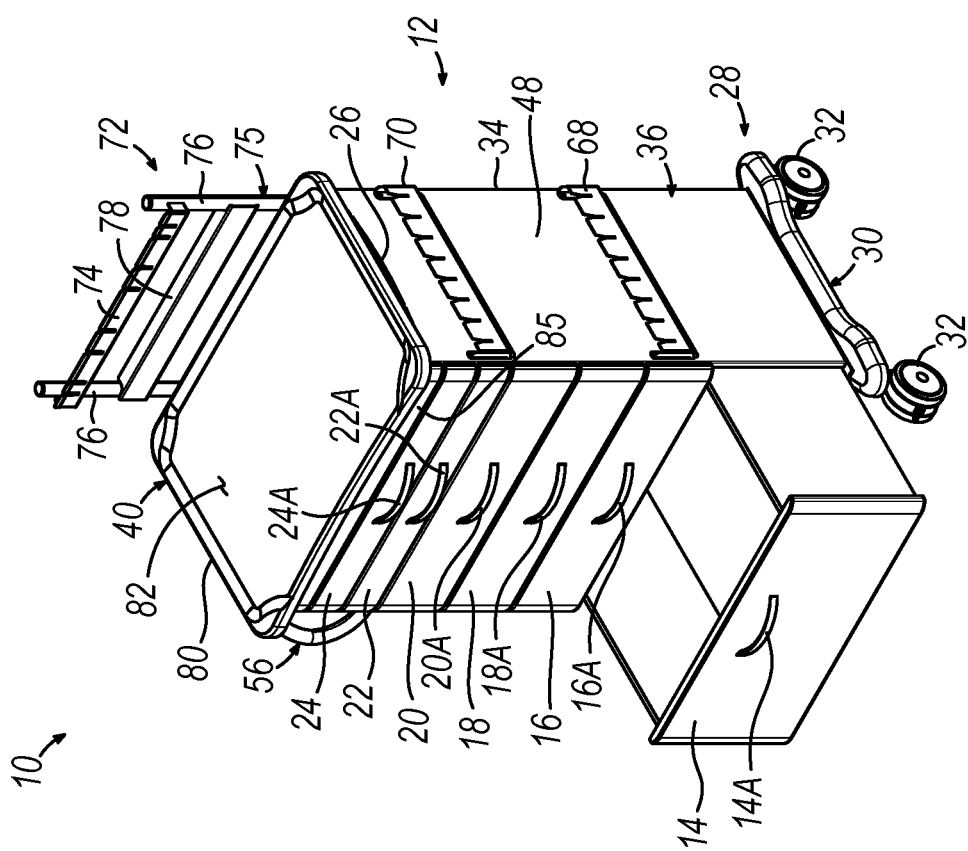
FIG. 7 depicts a front perspective view of the treatment cart of FIG. 1 with one of the plurality of drawers moved from a closed position to an open position.
Figure 9:
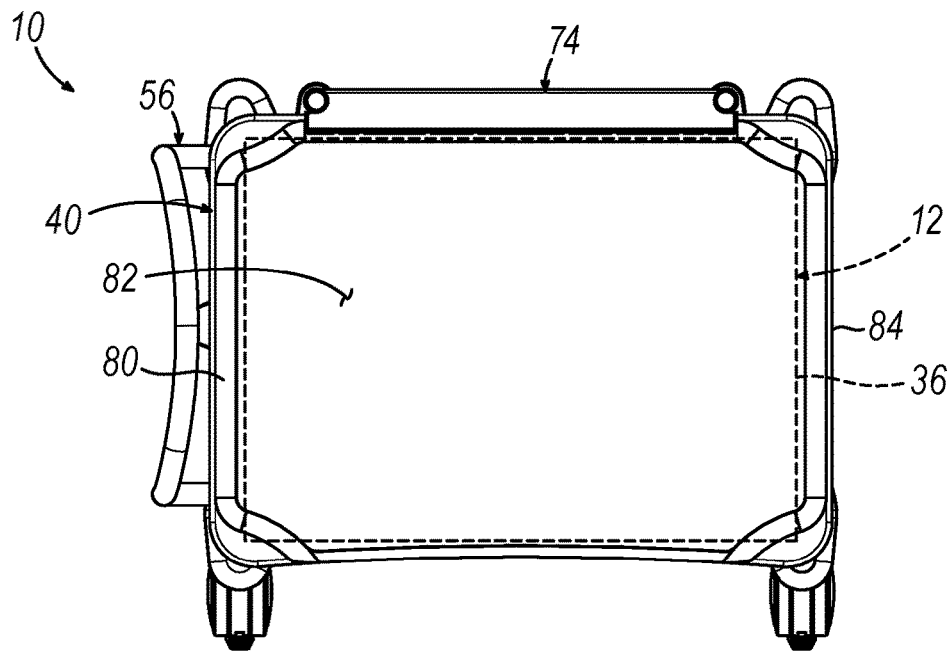
FIG. 9 depicts a top view of the treatment cart of FIG. 1.

With respect to FIG. 7, tabletop (40) secures atop frame (34) and includes an outer rim (80) surrounding a central surface (82), which is recessed relative to outer rim (80). Recessed central surface (82) surrounded by outer rim (80) thus defines a basin configured to retain any solids or liquids that may collect on central surface (82) and inhibit such solids or liquids from falling off of tabletop (40) toward the floor. Outer rim (80) of the present example projects laterally beyond frame (34) and housing (36) of body (12) in front, rear, left, and right directions similar to outrigger portions (42, 44) of base (28). To this end, as shown in FIGS. 7-9, outer rim (80) defines an outer lateral envelope (84) projecting laterally beyond frame (34) and housing (36) of body (12) such that frame (34) and housing (36) of body (12) are positioned laterally within outer lateral envelope (84), such as when viewed from a vertical direction (see FIG. 9).

As briefly discussed above, drawers (14, 16, 18, 20, 22, 24) are configured to selectively move, such as by sliding, between closed and open positions. Each of drawers (14, 16, 18, 20, 22, 24) has respective drawer handles (14A, 16A, 18A, 20A, 22A, 24A). In addition, a spacer (85), such as a faux drawer, may be provided with similar features as any one or more of drawers (14, 16, 18, 20, 22, 24), but without the ability to be moved between the open and closed positions. One such example of spacer (85) is provided proximate to tabletop (85) at the uppermost area of the column of stacked drawers (14, 16, 18, 20, 22, 24). By way of example, FIG. 7 depicts bottom drawer (14) in a fully open position, whereas the remaining drawers (16, 18, 20, 22, 24) are in the closed position.

Treatment cart (10) further includes a locking mechanism (86) configured to selectively lock all remaining drawers (14, 16, 18, 20, 22, 24) in the closed position if one of drawers (14, 16, 18, 20, 22, 24) is not in the closed position (i.e., at least partially open in the open position). However, when all drawers (14, 16, 18, 20, 22, 24) are in the closed position, then locking mechanism (86) is configured to unlock all drawers (14, 16, 18, 20, 22, 24) such that the user may selectively open any one of drawers (14, 16, 18, 20, 22, 24). Thus, only one drawer (14, 16, 18, 20, 22, 24) may be in the open position at any given time for inhibiting the user from unintentionally shifting too much weight forward beyond wheels (32) and thereby reducing the risk of tipping treatment cart (10) over onto the floor during use. In the present example, bottom drawer (14) is shown in the fully open position such that locking mechanism (86) has unlocked bottom drawer (14) for selective movement, but locked all remaining drawers (16, 18, 20, 22, 24) to inhibit the user from opening additional drawers (16, 18, 20, 22, 24). It will be appreciated that other configurations of locking and/or unlocking drawers (14, 16, 18, 20, 22, 24) may be incorporated into treatment cart (10) such that the invention is not intended to be unnecessarily limited to locking mechanism (86) shown in the present example.

II. Pass Through Tray

With respect to FIGS. 10-12, treatment cart (10) of the present example includes tray (26) positioned vertically below tabletop (40) and selectively slidable from the stowed position of tray (26) shown in FIG. 10 to either one of the right lateral position depicted in FIG. 11 or the left lateral position depicted in FIG. 12. More particularly, tray (26) in the stowed position is positioned laterally inward of outer lateral envelope (84) of tabletop (40) such that an entirety of tray (26) is within outer lateral envelope (84) of tabletop (40) and directly vertically below tabletop (40). In the right lateral position, tray (26) projects rightward from body (12) and beyond outer lateral envelope (84) revealing at least the rightward portion of tray (26) for use such that at least the rightward portion of tray (26) is neither vertically below tabletop (40) nor within outer lateral envelope (84). The left lateral position, tray (26) projects leftward from body (12) and beyond outer lateral envelope (84) revealing at least the leftward portion of tray (26) for use such that at least the leftward portion of tray (26) is neither vertically below tabletop (40) nor within outer lateral envelope (84).

Figure 12:
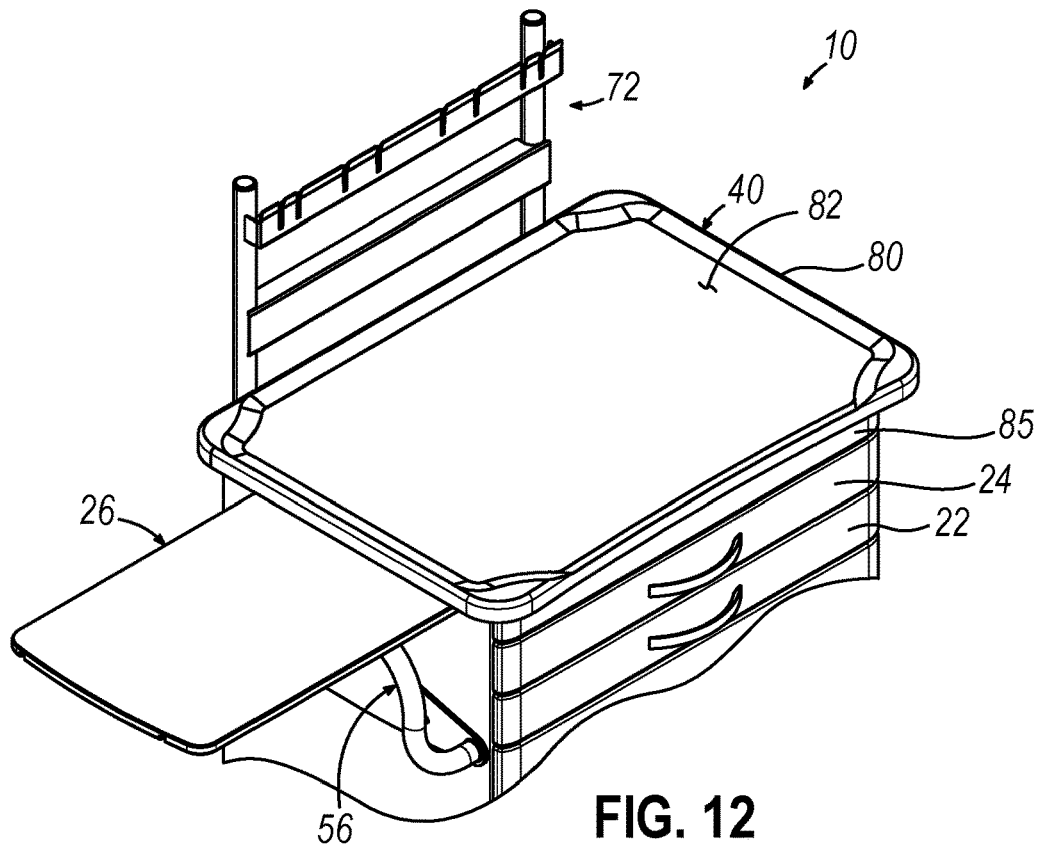
FIG. 12 depicts an enlarged perspective view of the treatment cart of FIG. 1 with the tray in a left lateral position of the plurality of positions.
Figure 13:
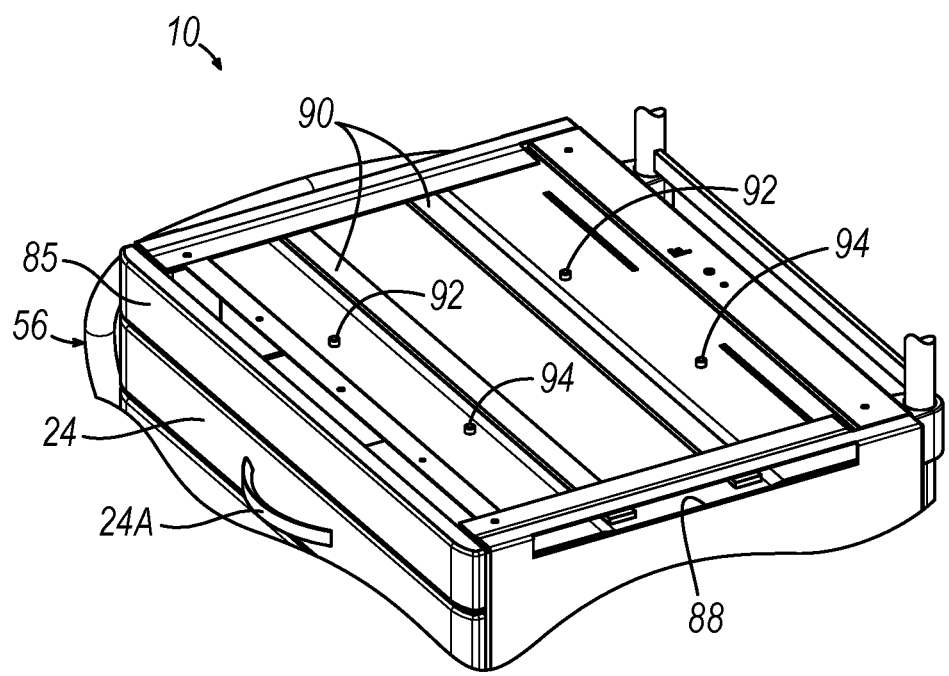
FIG. 13 depicts an enlarged perspective view of the treatment cart of FIG. 1 with the tray and various features hidden for additional clarity.
Figure 14:
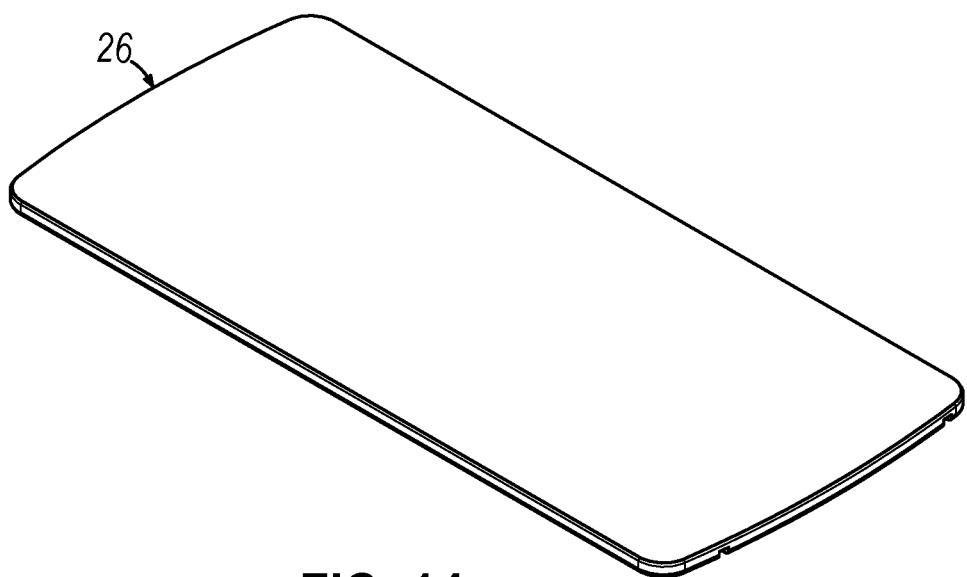
FIG. 14 depicts a top view of the tray of FIG. 1.
Figure 15:
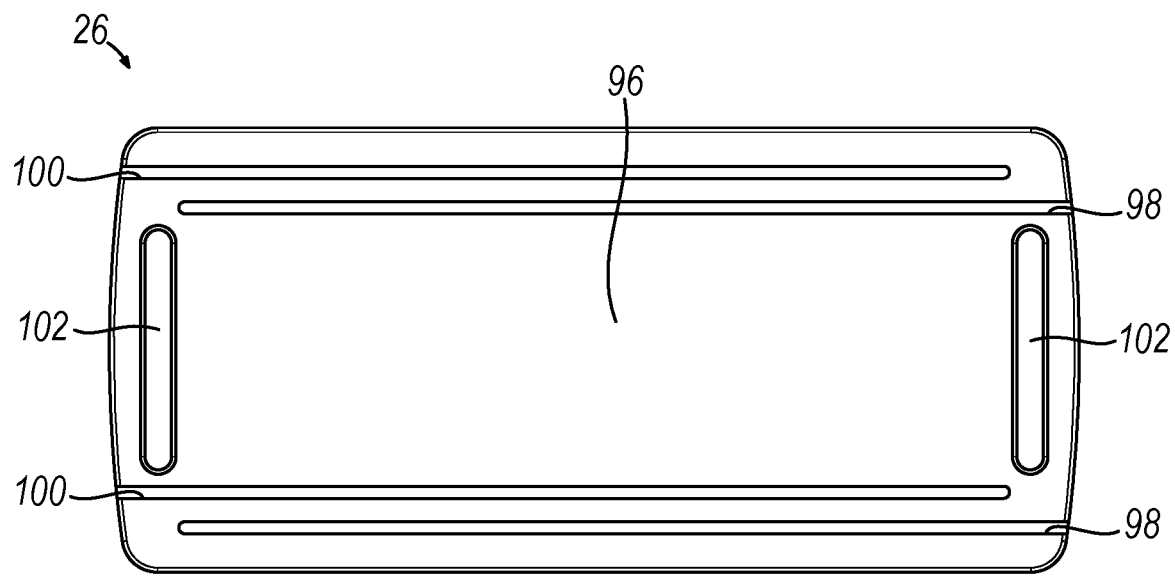
FIG. 15 depicts a bottom view of the tray of FIG. 1.
Figure 16:
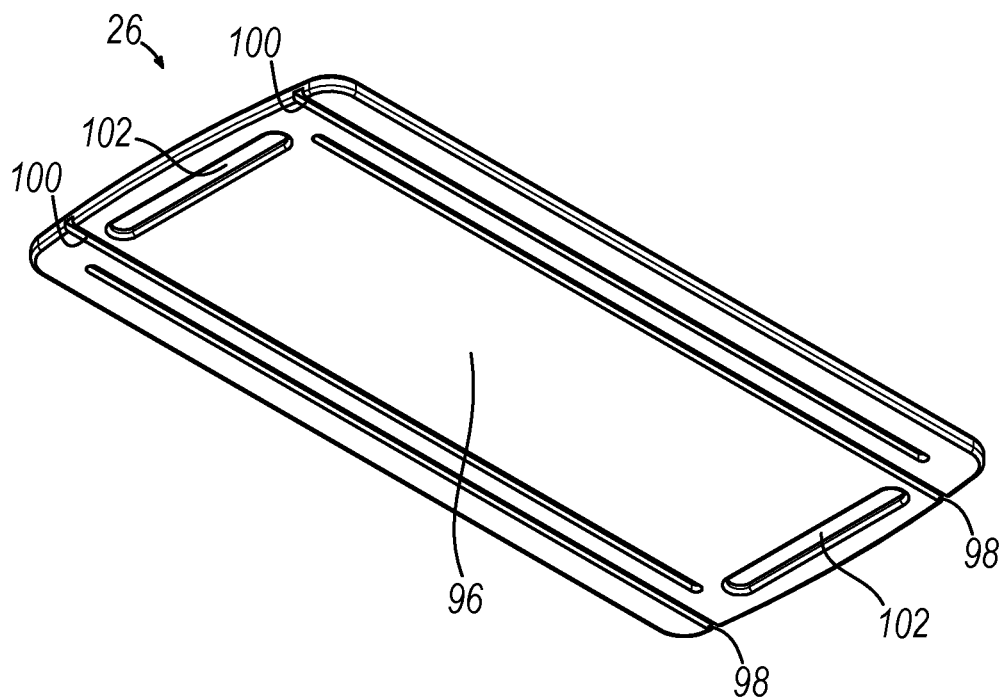
FIG. 16 depicts a bottom perspective view of the tray of FIG. 1.

FIG. 13 shows a slot (88) laterally extending from right panel (48) through to left panel (50) of housing (36) below tabletop (40) (see FIG. 12) and configured to slidably receive tray (26) shown in greater detail in FIGS. 14-16. Tray (26) is slidably supported by a pair of rail supports (90), a pair of first guide pegs (92), and a pair of second guide pegs (94). More particularly, each rail support (90) receives a planar portion of bottom surface (96) thereagainst such that rail supports (90) support tray (26) while also allowing for relative ease of lateral sliding as directed by the user. In one example, one or both rail supports (90) are formed of a relatively low-friction material to encourage ease of such sliding. Similarly, in one example, the planar portion of bottom surface (96) includes a relatively low-friction material thereon to encourage ease of such sliding.

Guide pegs (92, 94) also support tray (26) for sliding and, in addition, collectively capture tray (26) to body (12) to inhibit tray (26) from being inadvertently completely removed from slot (88) during use. Bottom surface (96) further includes a pair of first guide channels (98) and a pair of second guide channels (100) configured to respectively receive pairs of first and second guide pegs (92, 94) to inhibit forward or rearward movement of tray (26) as well as prevent leftward or rightward sliding of tray (26) beyond a predetermined leftward position and a predetermined rightward position.

The pair of first guide channels (98) open to a right end of tray (26) and extend leftward therefrom to leftward terminal ends thereof so as to be inward of a left end of tray (26). First guide channels (98) thus respectively receive first guide pegs (92) to guide sliding of tray (26) during use and provide stops at leftward terminal ends in the event that first guide pegs (92) engage against leftward terminal ends upon selective positioning of tray (26) in the predetermined rightward position.

Similarly, the pair of second guide channels (100) open to a left end of tray (26) and extend rightward therefrom to rightward terminal ends thereof so as to be inward of a right end of tray (26). Second guide channels (100) thus respectively receive second guide pegs (94) to guide sliding of tray (26) during use and provide stops at rightward terminal ends in the event that second guide pegs (94) engage against rightward terminal ends upon selective positioning of tray (26) in the predetermined leftward position.

Bottom surface (96) of tray (26) also includes a pair of handles (102) positioned on opposing right and left end portions of tray (26). Each handle (102) of the present example projects outward from body (12) with tray (26) in the stowed position so as to be accessible to the user for gripping and manipulating tray (26) leftward or rightward. While the present arrangement of rail supports (90), guide pegs (92, 94), guide channels (98, 100), and handle (102) are configured to guide and ease selective manipulation of tray (26) by the user, it will be appreciated that alternative arrangements of such features as well as alternative structures may be similarly used for guiding tray (26). The invention is thus not intended to be unnecessarily limited to rail supports (90), guide pegs (92, 94), guide channels (98, 100), and handles (102) of the present example.

III. Methods of Use

In use, with respect to FIG. 1, the user grips handle (56) and urges handle (56) in a desired direction to thereby selectively roll wheels (32) along the floor and direct treatment cart (10) toward a patient while carrying medical supplies for use with the patient. The user may access any of these medical supplies, such as by accessing any of bins (not shown) on bin racks (68, 70, 74), drawers (14, 16, 18, 20, 22, 24), tabletop (40), or tray (26) containing such medical supplies or configured to support such medical supplies. With respect to medical supplies contained within drawers (14, 16, 18, 20, 22, 24) shown in FIGS. 7-8, each of drawers (14, 16, 18, 20, 22, 24) may initially be in the closed position such that all drawers (14, 16, 18, 20, 22, 24) are unlocked and configured to be opened from the closed position. The user selects and pulls one of drawers (14, 16, 18, 20, 22, 24) open and, in turn, locking mechanism (86) locks the remainder of drawers (14, 16, 18, 20, 22, 24). The user may then inspect the contents of one of drawers (14, 16, 18, 20, 22, 24) in the open position and remove and/or add a medical supply as needed. The user may than close the open one of drawers (14, 16, 18, 20, 22, 24) to the closed position such that locking mechanism (86) unlocks the remainder of drawers (14, 16, 18, 20, 22, 24) for accessing any one of drawers (14, 16, 18, 20, 22, 24) as desired.

Figure 10:
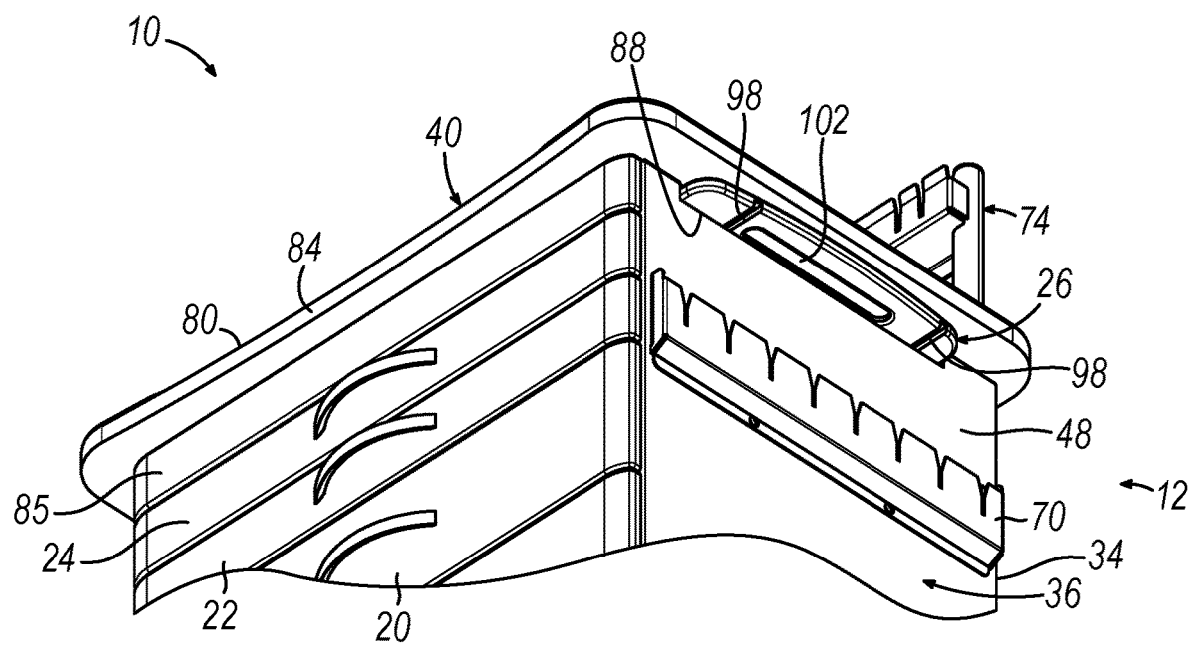
FIG. 10 depicts an enlarged perspective view of the treatment cart of FIG. 1 with the tray in a stowed position of the plurality of positions.
Figure 11:
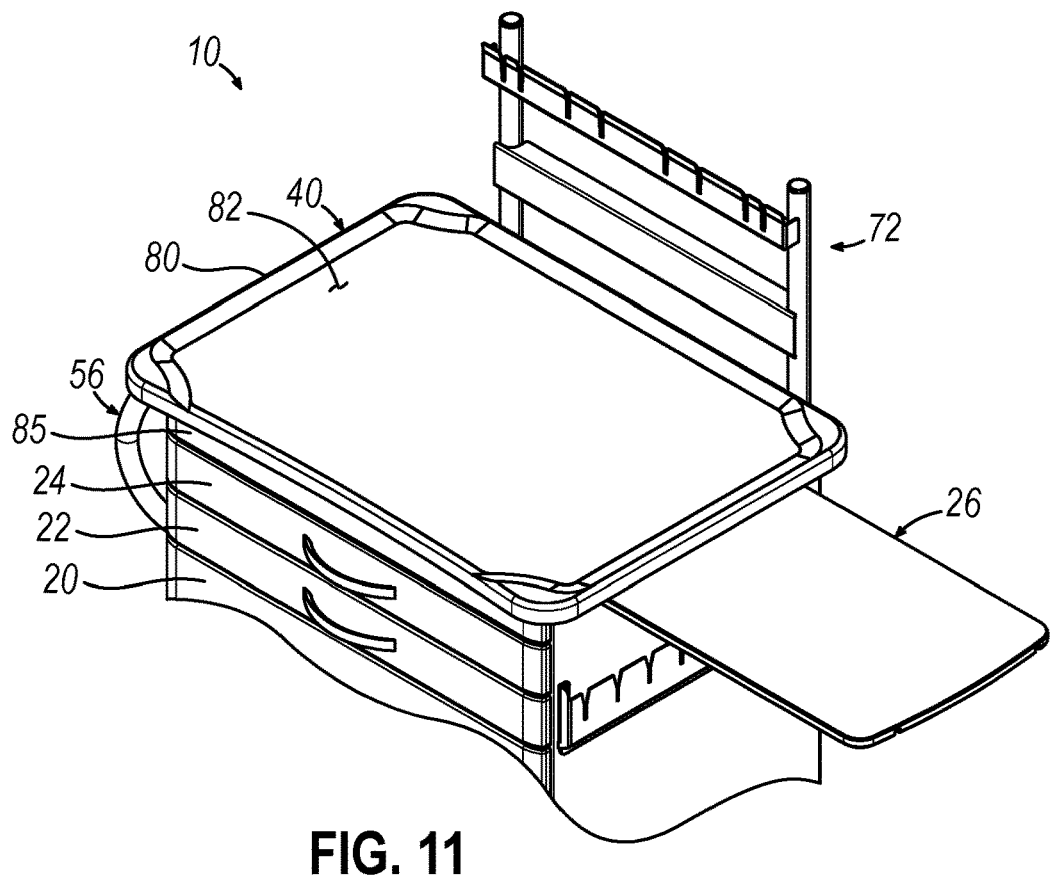
FIG. 11 depicts an enlarged perspective view of the treatment cart of FIG. 1 with the tray in a right lateral position of the plurality of positions.

In addition, or alternatively as shown in FIGS. 10-12, the user may desire to reveal tray (26) from underneath tabletop (40) for an added working surface in addition to tabletop (40). Tray (26) may initially be in the stowed position completely below tabletop (40) such that the user grips at least one of handles (102) and urges tray (26) to slide leftward or rightward to the left or right lateral positions, respectively. In either case, tray (26) passes at least partially through slot (88) in body (12) to reveal tray proximately positioned relative to tabletop (40) for use. In the event that tray (26) is already in one of the left or right lateral positions, such as after use or application of one or more medical supplies, the user may slide tray (26) back to the stowed position for future use or further through slot (88) as desired. In any case, tray (26) remains captured at least partially in slot (88) by guide pegs (92, 94) in guide channels (98, 100) such that tray (26) remains connected to a remainder of treatment cart (10) during use. In one example, tray (26) may be releasably connected to the remainder of treatment cart (10) for removal, such as for maintenance, including cleaning.

With access and use of medical supplies completed, the user returns tray (26) to the stowed position, closes any drawers (14, 16, 18, 20, 22, 24) to the closed position, and grips handle (56) to roll treatment cart (10) to the next patient or additional medical supplies for further use. While the present use discussed above describes one such example of accessing medical supplies, it will be appreciated that these features of treatment cart (10), including, but not limited to, bins (not shown) on bin racks (68, 70, 74), drawers (14, 16, 18, 20, 22, 24), tabletop (40), or tray (26) may be accessed for use in any such order. The invention is thus not intended to be unnecessarily limited to the particular use described herein.

IV. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A cart for tending to a patient, comprising: (a) a base including a plurality of wheels; (b) a tabletop; (c) a body vertically extending from the base to the tabletop and supporting the tabletop thereon; (d) a first drawer supported by the body and configured to selectively move from a first closed position toward a first open position; and (e) a tray movably supported by the body such that the tray is configured to selectively move from a stowed position toward a first lateral position and from the stowed position toward a second lateral position, wherein the tray in the stowed position is vertically below the tabletop, wherein the tray in the first lateral position projects laterally from the body such that at least a first portion of the tray is not vertically below the tabletop and thus exposed for access, and wherein the tray in the second lateral position projects laterally from the body such that at least a second portion of the tray is not vertically below the tabletop and thus exposed for access.

Example 2

The cart of Example 1, wherein at least a portion of the tray remains vertically below the tabletop in each of the stowed, first lateral, and second lateral positions.

Example 3

The cart of Example 2, wherein the at least the portion of the tray remains directly vertically below the tabletop in each of the stowed, first lateral, and second lateral positions.

Example 4

The cart of any one or more of Examples 1 through 3, wherein the tray in the stowed position is directly vertically below the tabletop.

Example 5

The cart of any one or more of Examples 1 through 4, wherein the tray includes a first handle and a laterally opposing second handle, wherein the second and first handles respectively project laterally from the body in the stowed position for access.

Example 6

The cart of Example 5, wherein the first handle is positioned vertically below the tabletop with the tray in the second lateral position and inward of the body, and wherein the second handle is positioned vertically below the tabletop with the tray in the first lateral position and inward of the body.

Example 7

The cart of any one or more of Examples 1 through 6, wherein the tabletop defines an outer lateral envelope, and wherein the tray in the stowed position is within the outer lateral envelope below the tabletop.

Example 8

The cart of any one or more of Examples 1 through 7, wherein the tray is positioned vertically between the first drawer and the tabletop.

Example 9

The cart of any one or more of Examples 1 through 8, further comprising a second drawer supported by the body and configured to selectively move from a second closed position toward a second open position, wherein the second drawer is locked in the second closed position when the first drawer is not in the first closed position, and wherein the first drawer is locked in the first closed position when the second drawer is not in the second closed position.

Example 10

The cart of any one or more of Examples 1 through 9, wherein at least one of the plurality of wheels projects laterally outward relative to the body for enhanced stability.

Example 11

The cart of any one or more of Examples 1 through 10, further comprising a rack supported by the body and configured to receive a medical supply thereon.

Example 12

The cart of Example 11, further comprising a lateral side panel extending from the base toward the tabletop, wherein the rack is positioned on the lateral side panel.

Example 13

The cart of any one or more of Examples 1 through 12, further comprising a rack assembly supported by the body and extending upward from the body such that at least a portion of the rack assembly is vertically higher than the tabletop, wherein the rack assembly is configured to receive a medical supply thereon.

Example 14

The cart of any one or more of Examples 1 through 13, further comprising a cart handle supported by the body.

Example 15

The cart of Example 14, further comprising a lateral side panel extending from the base toward the tabletop, wherein the cart handle is positioned on the lateral side panel.

Example 16

The cart of Example 15, wherein the tray in at least one of the second or first lateral positions is positioned vertically offset from the cart handle.

Example 17

The cart of any one or more of Examples 15 through 16, wherein the tray in at least one of the second or first lateral positions is positioned vertically above the cart handle.

Example 18

The cart of any one or more of Examples 1 through 17, wherein the tabletop includes a rim surrounding a recess.

Example 19

A cart for tending to a patient, comprising: (a) a base including a plurality of wheels; (b) a tabletop; (c) a body extending in a vertical direction from the base to the tabletop and supporting the tabletop thereon; (d) a first drawer supported by the body and configured to selectively move from a first closed position toward a first open position; (e) a second drawer supported by the body and configured to selectively move from a second closed position toward a second open position; (f) a locking mechanism operatively connected to the first and second drawers, wherein the second drawer is locked by the locking mechanism in the second closed position when the first drawer is not in the first closed position, and wherein the first drawer is locked by the locking mechanism in the first closed position when the second drawer is not in the second closed position; (g) a slot laterally extending perpendicular to the vertical direction through the body; and (h) a tray movably supported by the body within the slot such that the tray is configured to selectively move from a stowed position toward a first lateral position and from the stowed position toward a second lateral position, wherein the tray in the stowed position is vertically below the tabletop, wherein the tray in the first lateral position projects laterally from the body such that at least a first portion of the tray is not vertically below the tabletop and thus exposed for access, and wherein the tray in the second lateral position projects laterally from the body such that at least a second portion of the tray is not vertically below the tabletop and thus exposed for access.

Example 20

A cart for tending to a patient, comprising: (a) a base including a plurality of wheels; (b) a tabletop; (c) a body vertically extending from the base to the tabletop and supporting the tabletop thereon, wherein at least one of the plurality of wheels projects laterally outward relative to the body for enhanced stability; (d) a rack assembly supported by the body and extending upward from the body such that at least a portion of the rack assembly is vertically higher than the tabletop, wherein the rack assembly is configured to receive a medical supply thereon; (e) a cart handle supported by the body; (f) a lateral side panel extending from the base toward the tabletop, wherein the cart handle is positioned on the lateral side panel. (g) a first drawer supported by the body and configured to selectively move from a first closed position toward a first open position; and (h) a tray movably supported by the body such that the tray is configured to selectively move from a stowed position toward a first lateral position and from the stowed position toward a second lateral position, wherein the tray in the stowed position is vertically below the tabletop, wherein the tray in the first lateral position projects laterally from the body such that at least a first portion of the tray is not vertically below the tabletop and exposed for access, and wherein the tray in the second lateral position projects laterally from the body such that at least a second portion of the tray is not vertically below the tabletop and exposed for access, wherein at least a portion of the tray remains vertically below the tabletop in each of the stowed, first lateral, and second lateral positions, wherein the tray includes a first handle and a laterally opposing left handle, wherein the second and first handles respectively project laterally from the body in the stowed position for access, wherein the tray is positioned vertically between the first drawer and the tabletop, and wherein the tray in at least one of the second or first lateral positions is positioned vertically offset from the cart handle.

Example 21

A method of tending to a patient with a cart, the cart including a base, a tabletop, a body vertically extending from the base to the tabletop and supporting the tabletop thereon, and a tray movably supported by the body such that the tray is configured to selectively move from a stowed position toward a first lateral position and from the stowed position toward a second lateral position, wherein the tray in the stowed position is vertically below the tabletop, wherein the tray in the first lateral position projects laterally from the body such that at least a first portion of the tray is not vertically below the tabletop and thus exposed for access, and wherein the tray in the second lateral position projects laterally from the body such that at least a second portion of the tray is not vertically below the tabletop and thus exposed for access, the method comprising: (a) urging the tray through at least a portion of the body from the stowed position to either the first lateral position or the second lateral position thereby exposing a portion of the tray for tending to the patient.

V. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A cart for tending to a patient, comprising:
   (a) a base including a plurality of wheels;
   (b) a tabletop;
   (c) a body vertically extending from the base to the tabletop and supporting the tabletop thereon;
   (d) a first drawer supported by the body and configured to selectively move from a first closed position toward a first open position; and
   (e) a tray movably supported by the body such that the tray is configured to selectively move linearly from a stowed position toward a first lateral position and from the stowed position toward a second lateral position, wherein the tray in the stowed position is vertically below the tabletop, wherein the tray in the first lateral position projects laterally from the body such that at least a first portion of the tray is not vertically below the tabletop and thus exposed for access, and wherein the tray in the second lateral position projects laterally from the body such that at least a second portion of the tray is not vertically below the tabletop and thus exposed for access.

2. The cart of claim 1, wherein at least a portion of the tray remains vertically below the tabletop in each of the stowed, first lateral, and second lateral positions.

3. The cart of claim 2, wherein the at least the portion of the tray remains directly vertically below the tabletop in each of the stowed, first lateral, and second lateral positions.

4. The cart of claim 1, wherein the tray in the stowed position is directly vertically below the tabletop.

5. The cart of claim 1, wherein the tray includes a first handle and a laterally opposing second handle, wherein the second and first handles respectively project laterally from the body in the stowed position for access.

6. The cart of claim 5, wherein the first handle is positioned vertically below the tabletop with the tray in the second lateral position and inward of the body, and wherein the second handle is positioned vertically below the tabletop with the tray in the first lateral position and inward of the body.

7. The cart of claim 1, wherein the tabletop defines an outer lateral envelope, and wherein the tray in the stowed position is within the outer lateral envelope below the tabletop.

8. The cart of claim 1, wherein the tray is positioned vertically between the first drawer and the tabletop.

9. The cart of claim 1, further comprising a second drawer supported by the body and configured to selectively move from a second closed position toward a second open position, wherein the second drawer is locked in the second closed position when the first drawer is not in the first closed position, and wherein the first drawer is locked in the first closed position when the second drawer is not in the second closed position.

10. The cart of claim 1, wherein at least one of the plurality of wheels projects laterally outward relative to the body for enhanced stability.

11. The cart of claim 1, further comprising a rack supported by the body and configured to receive a medical supply thereon.

12. The cart of claim 11, further comprising a lateral side panel extending from the base toward the tabletop, wherein the rack is positioned on the lateral side panel.

13. The cart of claim 1, further comprising a rack assembly supported by the body and extending upward from the body such that at least a portion of the rack assembly is vertically higher than the tabletop, wherein the rack assembly is configured to receive a medical supply thereon.

14. The cart of claim 1, further comprising a cart handle supported by the body.

15. The cart of claim 14, further comprising a lateral side panel extending from the base toward the tabletop, wherein the cart handle is positioned on the lateral side panel.

16. The cart of claim 15, wherein the tray in at least one of the second or first lateral positions is positioned vertically offset from the cart handle.

17. The cart of claim 15, wherein the tray in at least one of the second or first lateral positions is positioned vertically above the cart handle.

18. The cart of claim 1, wherein the tabletop includes a rim surrounding a recess.

19. A cart for tending to a patient, comprising:
(a) a base including a plurality of wheels;
(b) a tabletop;
(c) a body extending in a vertical direction from the base to the tabletop and supporting the tabletop thereon;
(d) a first drawer supported by the body and configured to selectively move from a first closed position toward a first open position;
(e) a second drawer supported by the body and configured to selectively move from a second closed position toward a second open position;
(f) a locking mechanism operatively connected to the first and second drawers, wherein the second drawer is locked by the locking mechanism in the second closed position as a result of and when the first drawer is not in the first closed position, and wherein the first drawer is locked by the locking mechanism in the first closed position when the second drawer is not in the second closed position;
(g) a slot laterally extending perpendicular to the vertical direction through the body; and
(h) a tray movably supported by the body within the slot such that the tray is configured to selectively move from a stowed position toward a first lateral position and from the stowed position toward a second lateral position, wherein the tray in the stowed position is vertically below the tabletop, wherein the tray in the first lateral position projects laterally from the body such that at least a first portion of the tray is not vertically below the tabletop and thus exposed for access, and wherein the tray in the second lateral position projects laterally from the body such that at least a second portion of the tray is not vertically below the tabletop and thus exposed for access.

20. A cart for tending to a patient, comprising:
(a) a base including a plurality of wheels;
(b) a tabletop;
(c) a body vertically extending from the base to the tabletop and supporting the tabletop thereon, wherein at least one of the plurality of wheels projects laterally outward relative to the body for enhanced stability;
(d) a rack assembly supported by the body and extending upward from the body such that at least a portion of the rack assembly is vertically higher than the tabletop, wherein the rack assembly is configured to receive a medical supply thereon;
(e) a cart handle supported by the body;
(f) a lateral side panel extending from the base toward the tabletop, wherein the cart handle is positioned on the lateral side panel;
(g) a first drawer supported by the body and configured to selectively move from a first closed position toward a first open position; and
(h) a tray movably supported by the body such that the tray is configured to selectively move from a stowed position toward a first lateral position and from the stowed position toward a second lateral position, wherein the tray in the stowed position is vertically below the tabletop, wherein the tray in the first lateral position projects laterally from the body such that at least a first portion of the tray is not vertically below the tabletop and exposed for access, and wherein the tray in the second lateral position projects laterally from the body such that at least a second portion of the tray is not vertically below the tabletop and exposed for access,
wherein at least a portion of the tray remains vertically below the tabletop in each of the stowed, first lateral, and second lateral positions,
wherein the tray includes a first handle and a laterally opposing second handle, wherein the second and first handles respectively project laterally from the body beyond a lateral-most portion of the body in the stowed position for access,
wherein the tray is positioned vertically between the first drawer and the tabletop, and
wherein the tray in at least one of the second or first lateral positions is positioned vertically offset from the cart handle.

* * * * *